United States Patent
Chou

(10) Patent No.: US 11,228,250 B2
(45) Date of Patent: Jan. 18, 2022

(54) FLYBACK POWER SWITCH STRUCTURE FOR BRIDGELESS RECTIFIER

(71) Applicant: Chung-Fu Chou, Yongkang (TW)

(72) Inventor: Chung-Fu Chou, Yongkang (TW)

(73) Assignee: NANOWATT INC., Santa Clara, CA (US)

( * ) Notice: Subject to any disclaimer, the term of this patent is extended or adjusted under 35 U.S.C. 154(b) by 0 days.

(21) Appl. No.: 16/867,641

(22) Filed: May 6, 2020

(65) Prior Publication Data

US 2021/0351705 A1 Nov. 11, 2021

(51) Int. Cl.
*H02M 3/335* (2006.01)
*H02M 1/00* (2006.01)

(52) U.S. Cl.
CPC ......... *H02M 3/33569* (2013.01); *H02M 1/00* (2013.01); *H02M 1/0048* (2021.05)

(58) Field of Classification Search
CPC .......... H02M 7/04; H02M 7/12; H02M 7/155; H02M 7/1555; H02M 7/162; H02M 7/1623; H02M 7/219; H02M 3/335; H02M 3/33507; H02M 3/33523; H02M 3/33569; H02M 1/0054; H02M 1/0003; H02M 1/0009
See application file for complete search history.

(56) References Cited

U.S. PATENT DOCUMENTS

| | | | | |
|---|---|---|---|---|
| 9,490,694 | B2 * | 11/2016 | Alam | H02M 1/4241 |
| 10,193,437 | B1 * | 1/2019 | Hari | H02M 1/4208 |
| 2016/0294296 | A1 * | 10/2016 | Lee | H02M 1/44 |
| 2017/0229972 | A1 * | 8/2017 | Cerqueira Pinto Bezerra Varaj O | H02M 7/797 |
| 2019/0319528 | A1 * | 10/2019 | Matsuura | H02M 1/083 |
| 2020/0099311 | A1 * | 3/2020 | Askarianabyaneh | H02M 1/4258 |
| 2020/0328695 | A1 * | 10/2020 | Iwazaki | H02M 1/4233 |
| 2020/0389093 | A1 * | 12/2020 | Tietema | H05B 45/385 |

FOREIGN PATENT DOCUMENTS

| | | | |
|---|---|---|---|
| CN | 103762839 A | * | 4/2014 |
| CN | 109921646 A | * | 6/2019 |

* cited by examiner

*Primary Examiner* — Thienvu V Tran
*Assistant Examiner* — Shahzeb K Ahmad
(74) *Attorney, Agent, or Firm* — Karin L. Williams; Alan D. Kamrath; Mayer & Williams PC

(57) ABSTRACT

A flyback power switch structure for bridgeless rectifier includes a main transformer, a primary side circuit, a secondary side circuit, and a feedback control circuit. The main transformer includes a primary coil and a secondary coil. The primary side circuit is connected to the input AC power supply and the primary coil of main transformer, and is provided with a first switch component, a second switch component, a third switch component, and a fourth switch component. The secondary side circuit is connected to the secondary coil of said main transformer, generating an output voltage. The feedback control circuit is connected to the secondary side circuit and the first, second, third and fourth switch components of primary side circuit, comparing phase signals according to the feedback signals and the first and second terminal voltages of an input AC power supply to control the actuation of the first, second, third and fourth switch components.

3 Claims, 12 Drawing Sheets

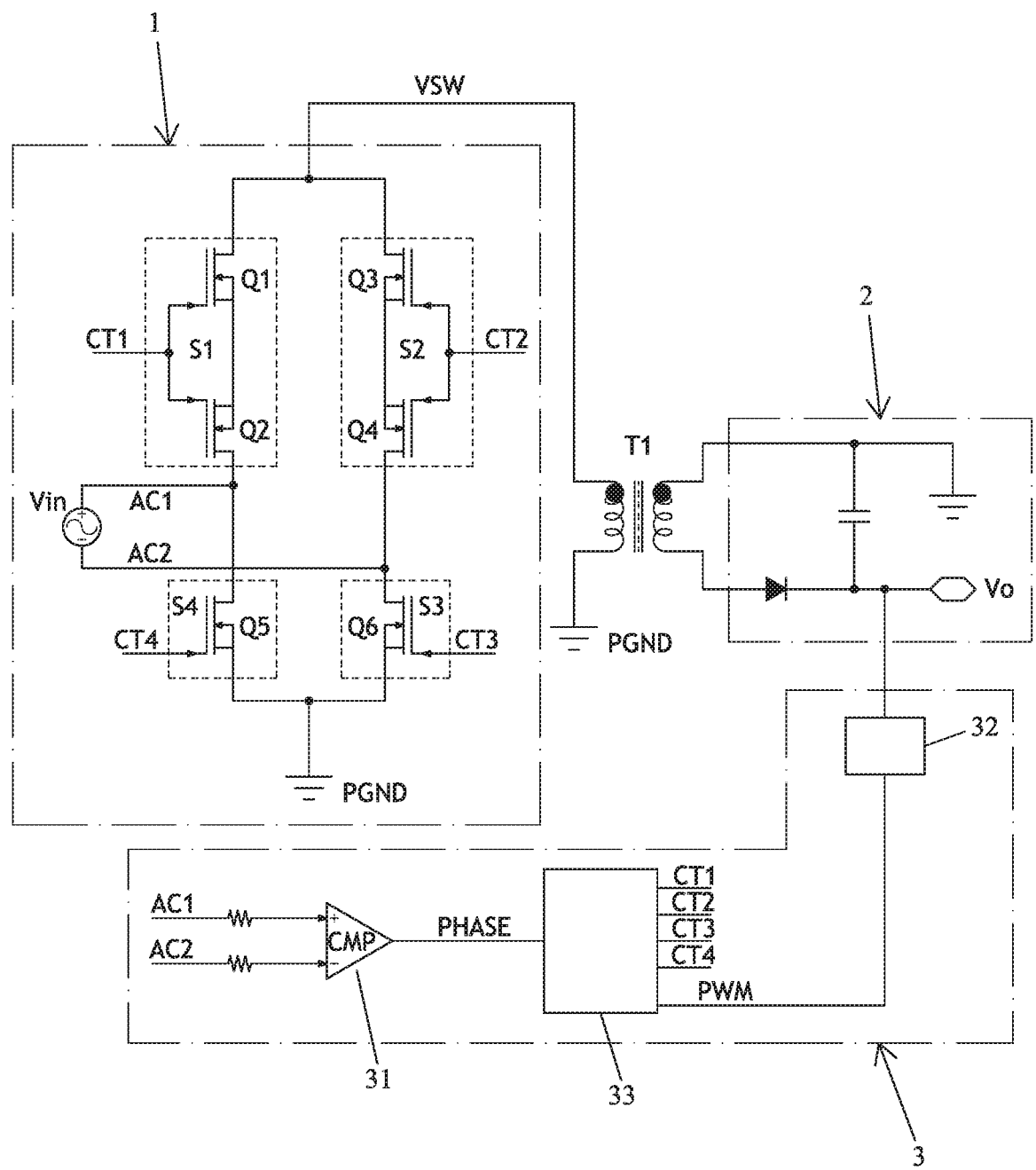
F I G . 1

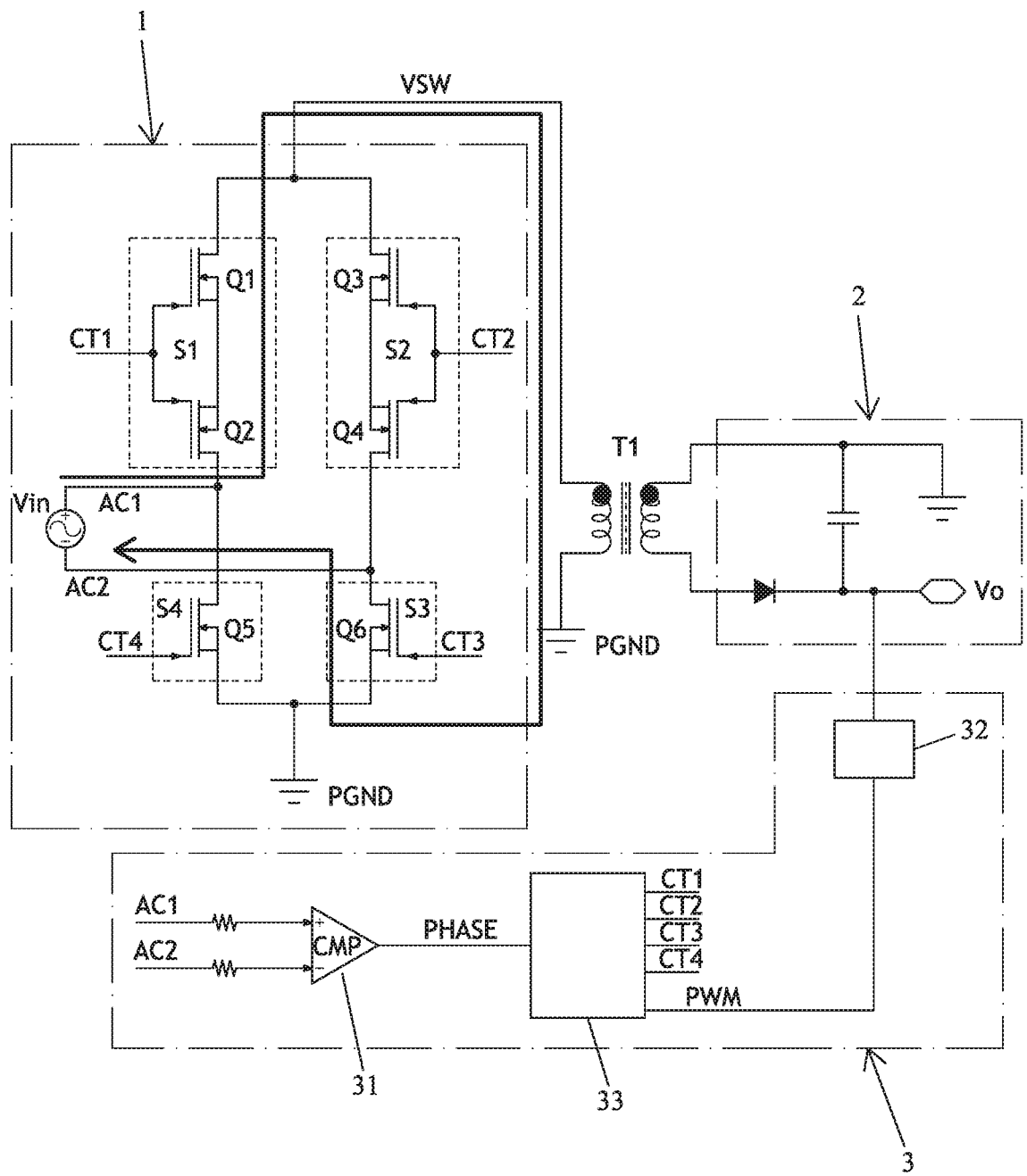
F I G . 4

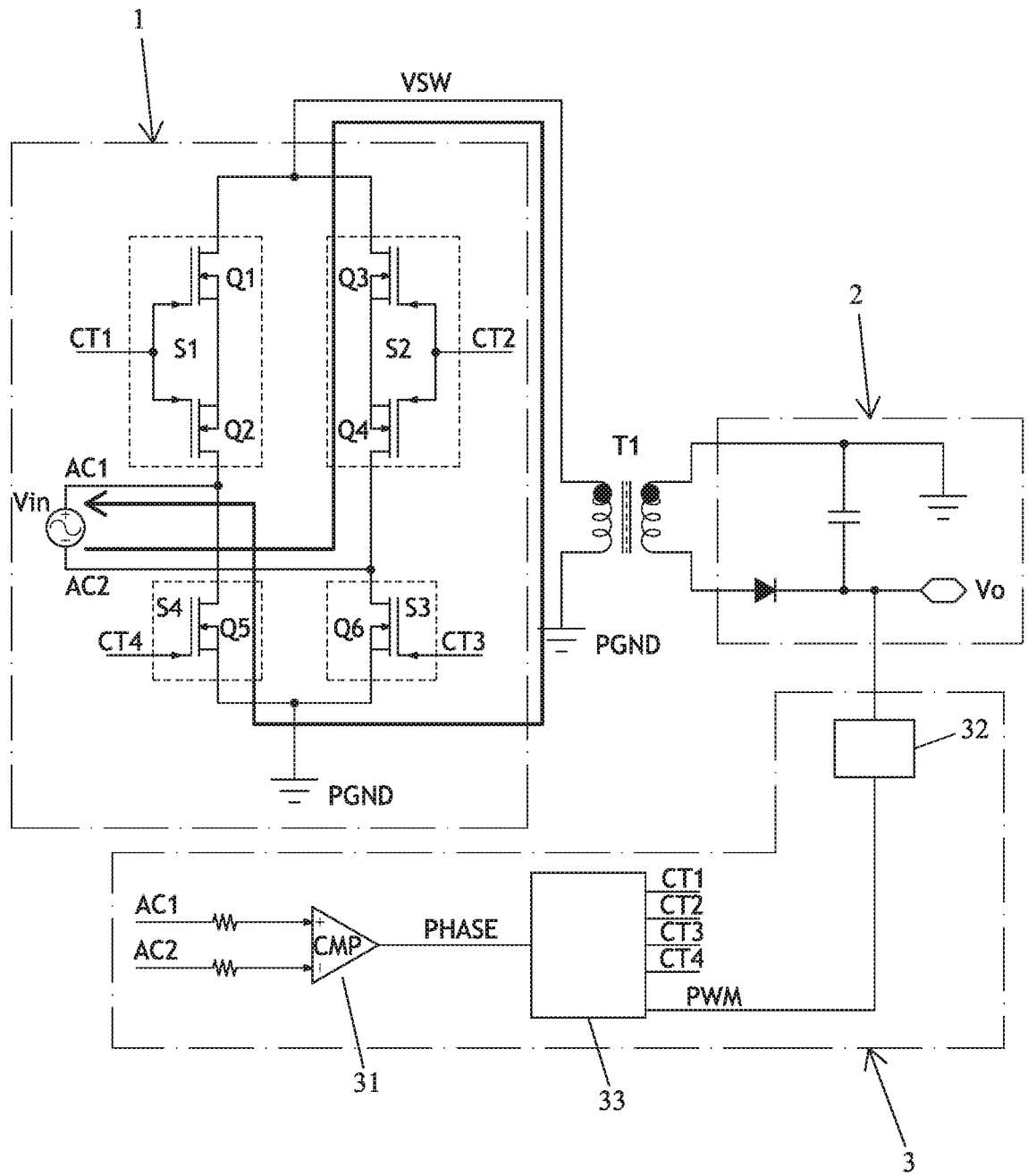
F I G . 5

FLYBACK POWER SWITCH STRUCTURE FOR BRIDGELESS RECTIFIER

BACKGROUND OF INVENTION

1. Field of the Invention

The present invention relates generally to a flyback power switch structure for bridgeless rectifier, and more particularly to a power supply structure which can enhance efficiency and can be miniaturized.

2. Description of Related Art

The switching power converter is extensively used in a variety of electronic devices. In order to enhance applicability, the present design of power converter aims at miniaturization. FIG. 9 shows a conventional flyback switching power converter, which comprises a main transformer T1', a primary side circuit 1' and a secondary side circuit 2'. The primary side circuit 1' further comprises a bridge rectifier composed of four diodes D1'~D4', a filter 11' and a switch component SW1'. Its advantages include simple structure, the PWM controller (not shown in the figure) can perform switchover work only by driving a switch component SW1'. Said switch component SW1' is a switch of potential to ground, so that the drive circuit design is easy, and can be integrated into the PWM controller. However, the bridge rectifier composed of four diodes D1'~D4' and filter 11' have heavy losses, thus reducing the efficiency.

FIG. 10 shows a second conventional flyback switching circuit for bridgeless rectifier of primary duplex winding. The primary side of the main transformer T2' of the circuit is provided with an additional winding, and further configured with two PWM signal controlled switch components SW2', SW3', and two rectifier diodes D5', D6'. Said structure reduces the energy loss of two diodes compared with the first conventional structure. However, as the two switch components SW2', SW3' are not potential to ground, and the drive circuit must be designed as isolated, thus it is difficult to be integrated into the PWM controller. Further, said structure is provided with an additional primary winding and an additional switch component, so that the snubber design difficulty is increased. In addition, the main transformer T2' is enlarged, thus not meeting the requirement for miniaturization.

FIG. 11 shows a third conventional flyback switching power circuit for bridgeless rectifier of secondary duplex winding. The main transformer T3' has two secondary windings connected to two rectifier diodes D7', D8' respectively, and is further configured with two oppositely cascaded switch components SW4', SW5'. However, the two switch components SW4', SW5' are not switch of potential to ground, and the drive circuit must be isolated, so that it is difficult to be integrated into the PWM controller. Further, due to AC phase limit, a secondary coil and secondary side rectifying components D7', D8' are required, thereby reducing the efficiency. Further, a two-way snubber (not shown in the figure) is required for the two additional switch components SW4', SW5', while the main transformer T3' requires two secondary windings. Therefore, the volume is increased, which does not meet the requirement for miniaturization.

FIG. 12 shows a fourth conventional flyback switching power circuit for bridgeless rectifier with dual transformers. Two sets of flyback converts are composed of two main transformers T4', T5', two switch components SW6', SW7' and two diodes D9', D10'. Said structure reduces the energy loss of two diodes in comparison with the first conventional design. However, the structure still has the energy loss of two diodes. As it requires two main transformers T4', T5', the large volume does not meet the requirement for miniaturization.

SUMMARY OF THE INVENTION

The object of the present invention is to provide a power supply structure which can enhance efficiency and can be miniaturized.

The flyback power switch structure for bridgeless rectifier of the present invention comprises a main transformer, a primary side circuit, a secondary side circuit and a feedback control circuit. Said main transformer has primary coil and secondary coil. Additionally, said primary side circuit is connected to the input AC power supply and the primary coil of main transformer, comprising a first switch component, a second switch component, a third switch component and a fourth switch component electrically connected to the first end and the second end of input AC power supply and the primary coil of main transformer. Moreover, said secondary side circuit is connected to the secondary coil of main transformer, generating output voltage. In addition, said feedback control circuit is connected to the secondary side circuit and the first, second, third and fourth switch components of the primary side circuit, and the phase signals are compared according to the feedback signal and the first and second terminal voltages of input AC power supply to control the actuation of the first, second, third and fourth switch components, thus generating the first and second loops.

Further, one end of said first and second switch components is connected to one end of the primary coil of main transformer, the other end of the primary coil is grounded. Additionally, the other end of said first switch is connected to one end of the fourth switch component with a first junction, and said first junction is connected to the first end of input AC power supply. Moreover, the other end of said second switch component is connected to one end of the third switch component with a second junction. Said second junction is connected to the second end of input AC power supply. The other end of said third and fourth switch components is grounded.

Further, said first to fourth switch components are MOSFETs. Each MOSFET comprises an S terminal, G terminal and D terminal which respectively refer to a source terminal, gate terminal and drain terminal. The first switch component comprises the first and second MOSFETs oppositely cascaded. The S terminals of said first and second MOSFETs are connected, and the G terminals are also connected, so that the on-off actions can be synchronous. Moreover, said second switch component comprises the third and fourth MOSFETs oppositely cascaded. Said third and fourth MOSFETs have S terminals connected and G terminals connected, so that the on-off actions can be synchronous.

The feedback control circuit of the present invention comprises a comparator, an isolated signal sensing circuit and a controller. Said comparator imports the first end and the second end of the input AC power supply, and exports the comparison signals to the controller. Additionally, said isolated signal sensing circuit senses the output voltage information of the secondary side circuit, and generates PWM signals to the controller. Moreover, the controller exports the first, second, third and fourth control signals in accordance to the comparator output signals and PWM signals and controls the actuation of the first, second, third and fourth switch components respectively.

The controller of the present invention has a logic circuit. In said logic circuit, when the first terminal voltage of input AC power supply is higher than the second terminal voltage, and the first phase signal and PWM signal are high potential, said first and third control signals turn on the first and third switch components synchronously to form a primary circuit, while the second and fourth switch components remain off. When the PWM signal is low potential, said first and third control signals turn off the first and third switch components synchronously. Additionally, when the second terminal voltage of input AC power supply is higher than the first terminal voltage, and the second phase signal and PWM signal are high potential, the second and fourth control signals turn on the second and fourth switch components synchronously to form a secondary circuit, while the first and third switch components remain off. When the PWM signal is low potential, said second and fourth control signals turn off the second and fourth switch components synchronously.

The controller of the present invention has a logic circuit. In said logic circuit, when the first terminal voltage of input AC power supply is higher than the second terminal voltage, and the first phase signal and PWM signal are high potential, the first control signal turns on the first switch component. Said third control signal and the first phase signal act synchronously, so that the third switch component is turned on to form a primary circuit. Moreover, when the PWM signal is low potential, said first control signal turns off the first switch component, while the second and fourth switch components remain off in this phase. Additionally, when the second terminal voltage of input AC power supply is higher than the first terminal voltage, which makes the second phase signal and PWM signal in high potential, the second control signal turns on the second switch component. Additionally, said fourth control signal and the second phase signal act synchronously, so said fourth switch component is turned on to form a secondary circuit. When the PWM signal is low potential, said second control signal turns off the second switch component, while the first and third switch components remain off in this phase.

The present invention can reduce the energy loss of rectifier diode, and it has better actuation stability and small size, thereby enhancing the efficiency and applicability of power converter.

BRIEF DESCRIPTION OF THE DRAWINGS

FIG. 1 is the circuit structure diagram of the present invention.

FIG. 4 is the schematic diagram of actuation of the first phase signal generated by the present invention.

FIG. 5 is the schematic diagram of actuation of the second phase signal generated by the present invention.

DETAILED DESCRIPTION OF THE INVENTION

Figure 2:
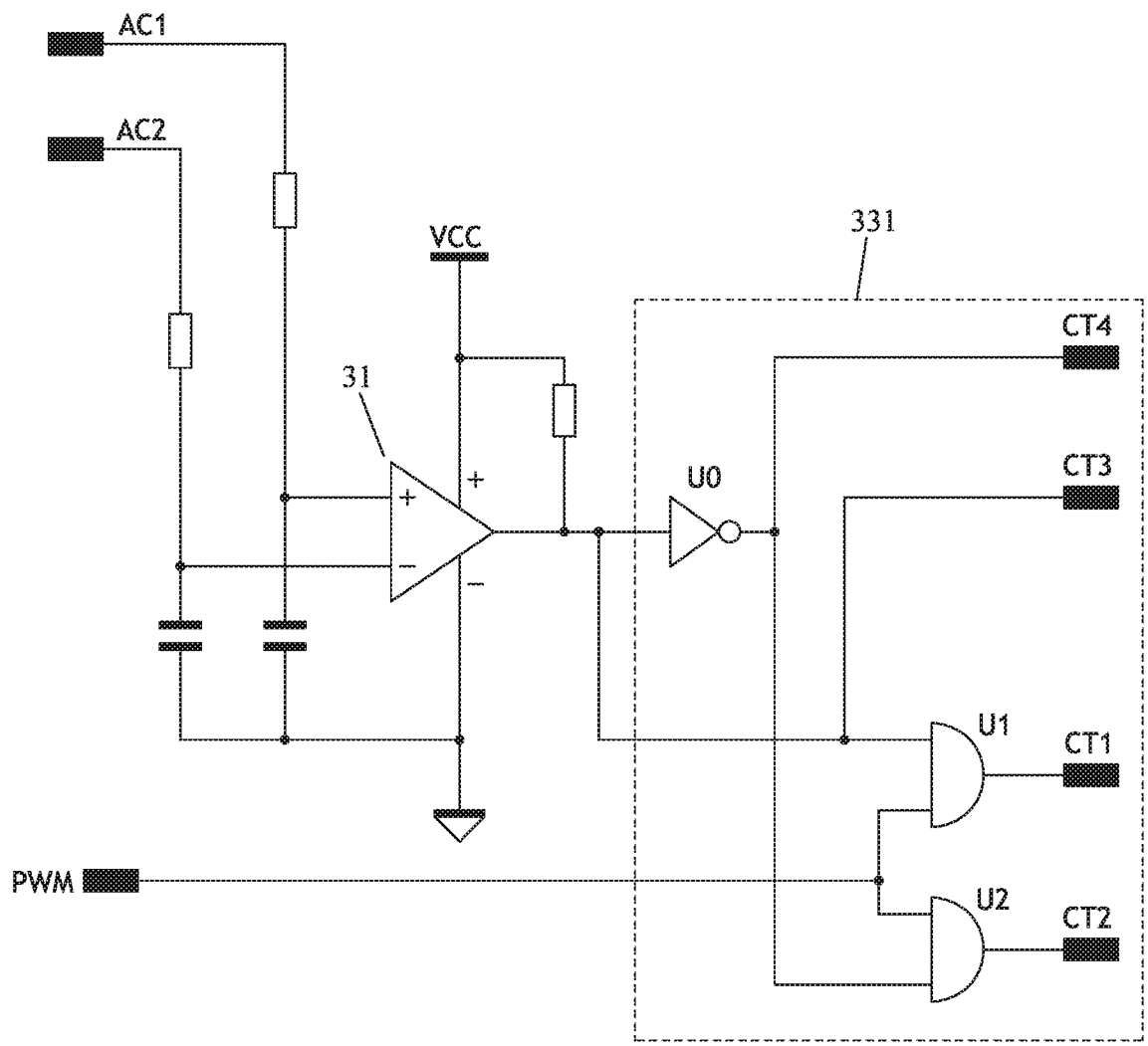
FIG. 2 is the switch drive logic circuitry of the present invention.

Referring to FIGS. 1 and 2, the present invention includes a main transformer T1, a primary side circuit 1, a secondary side circuit 2 and a feedback control circuit 3. The primary side circuit 1 is electrically connected to input AC power supply Vin and the primary coil of main transformer T1, with a first switch component S1 comprised of the first MOSFET Q1 and the second MOSFET Q2 oppositely cascaded; a second switch component S2 comprised of the third MOSFET Q3 and the fourth MOSFET Q4 oppositely cascaded, a third switch component S3 formed of the sixth MOSFET Q6, and a fourth switch component S4 formed of the fifth MOSFET Q5. S terminals of said first and second MOSFETs Q1, Q2 are connected, and S terminals of said third and fourth MOSFETs Q3, Q4 are connected, so that the internal parasitic diodes of said first and second MOSFETs Q1, Q2 and said third and fourth MOSFETs Q3, Q4 can be serially connected oppositely, thus to ensure that the internal parasitic diode can be turned off bilaterally when the first and second MOSFETs Q1, Q2 and the third and fourth MOSFETs Q3, Q4 are turned off, so as to enhance the actuation stability. Additionally, G terminals of said first and second MOSFETs Q1, Q2 are connected, and G terminals of said third and fourth MOSFETs Q3, Q4 are connected, so that the first and second MOSFETs Q1, Q2 can be turned on and off simultaneously. G terminals of said third and fourth MOSFETs Q3, Q4 are connected, so that said third and fourth MOSFETs Q3, Q4 can be turned on and off simultaneously.

D terminals of the first and third MOSFETs Q1, Q3 of said first and second switch components S1, S2 are connected to one end of primary coil of main transformer T1, and the other end of primary coil of said main transformer T1 is grounded. Additionally, D terminals of the second MOSFET Q2 of said first switch component S1 is connected to D terminals of the fifth MOSFET Q5 of the fourth switch component S4 with a first junction, and said first junction is connected to the first end AC1 of input AC power supply Vin. Moreover, D terminals of the fourth MOSFET Q4 of said second switch component S2 is connected to D terminals of the sixth MOSFET Q6 of the third switch component S3 with a second junction, and said second junction is connected to the second end AC2 of input AC power supply Vin. S terminals of the sixth MOSFET Q6 of said third switch component S3 is grounded, and S terminals of the fifth MOSFET Q5 of said fourth switch component S4 is grounded. Additionally, G terminals of the first and second MOSFET Q1, Q2 of said first switch component S1 import a first control signal CT1; G terminals of the third and fourth MOSFET Q3, Q4 of said second switch component S2 import a second control signal CT2; G terminals of the sixth MOSFET of said third switch component S3 imports a third control signal CT3; G terminals of the fifth MOSFET of said fourth switch component S4 imports a fourth control signal CT4.

Said secondary side circuit 2 is electrically connected to the secondary coil of main transformer T1, generating output voltage Vo.

Said feedback control circuit 3 is connected to the secondary side circuit 2 and primary side circuit 1, comprising a comparator 31, an isolated signal sensing circuit 32, and a controller 33. Said comparator 31 imports the information of the first and second ends AC1, AC2 of said input AC power supply Vin, and exports comparison signals. Said isolated signal sensing circuit 32 is connected to the secondary side circuit 2, and it can be provided with a component like optical coupler and an amplifying drive circuit (the known circuit diagram is not shown), sensing the output voltage Vo information to generate PWM signal which is imported into the controller 33. Additionally, said controller 33 has a logic circuit 331, the input side of said logic circuit 331 is connected to the output side of comparator 31, comprising an inverter U0, a first AND gate U1 and a second AND gate U2. Said inverter U0 is connected to the output side of comparator 31, while the output side of said comparator 31 imports the first AND gate U1, and the output side of said inverter U0 imports the second AND gate U2. Said first AND gate U1 and second AND gate U2 import the PWM signal, so that the first AND gate U1 exports the first control signal CT1, the second AND gate U2 exports the second control signal CT2, the comparator 31 exports the third control signal CT3, and the inverter U0 exports the fourth control signal CT4.

Figure 3:
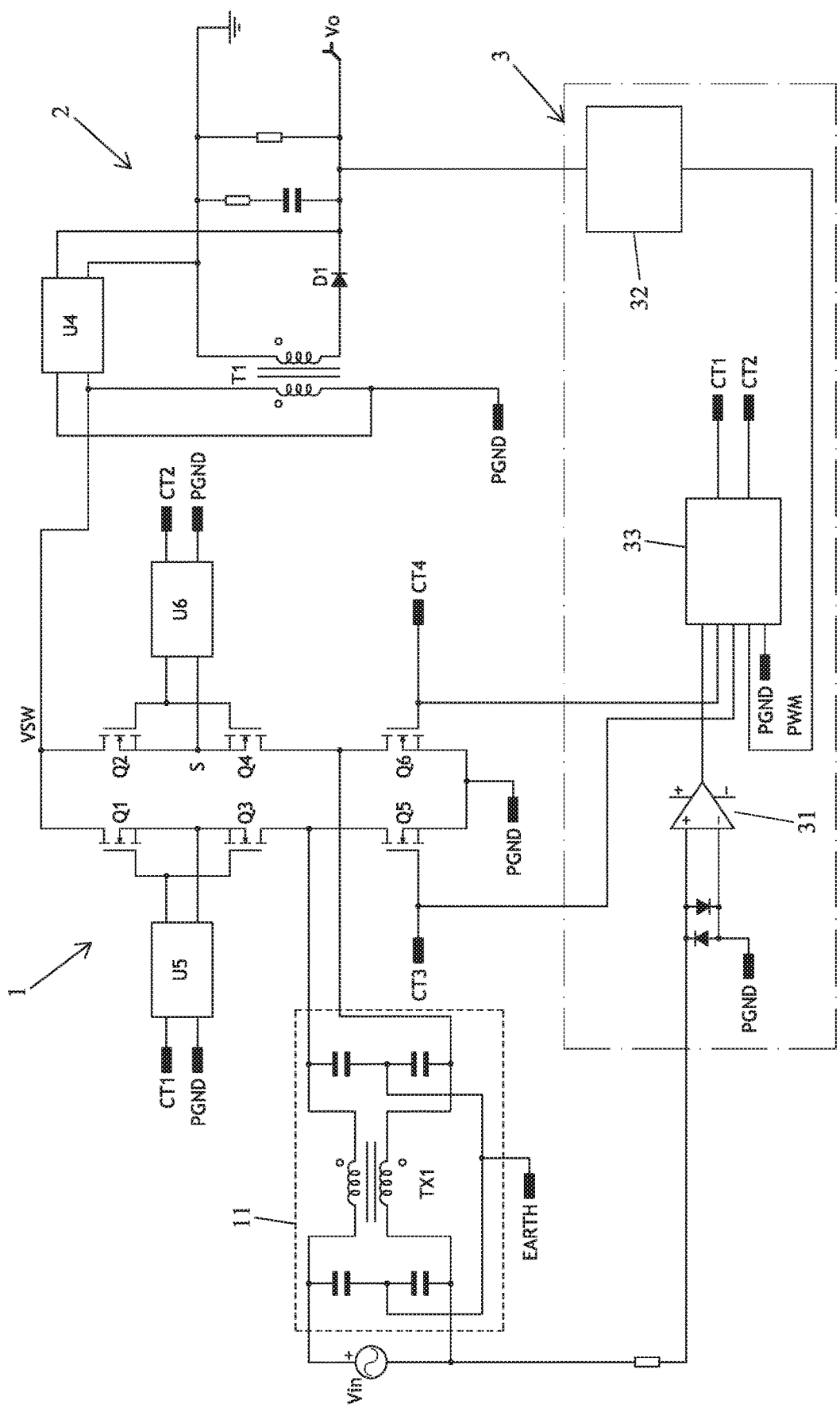
FIG. 3 is the circuit diagram of the present invention.
Figure 6:
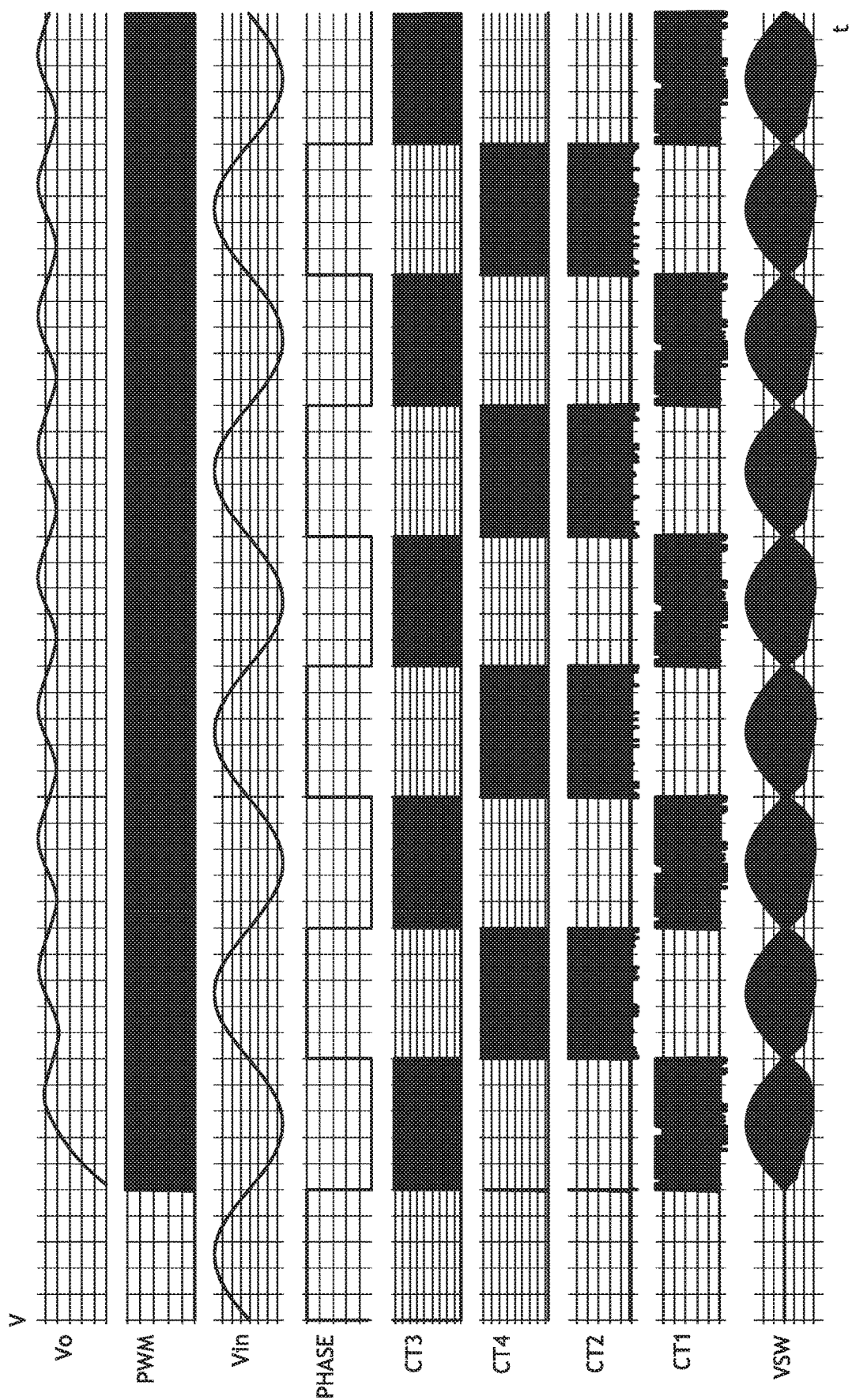
FIG. 6 is the schematic diagram of actuation waveform of the present invention.
Figure 7:
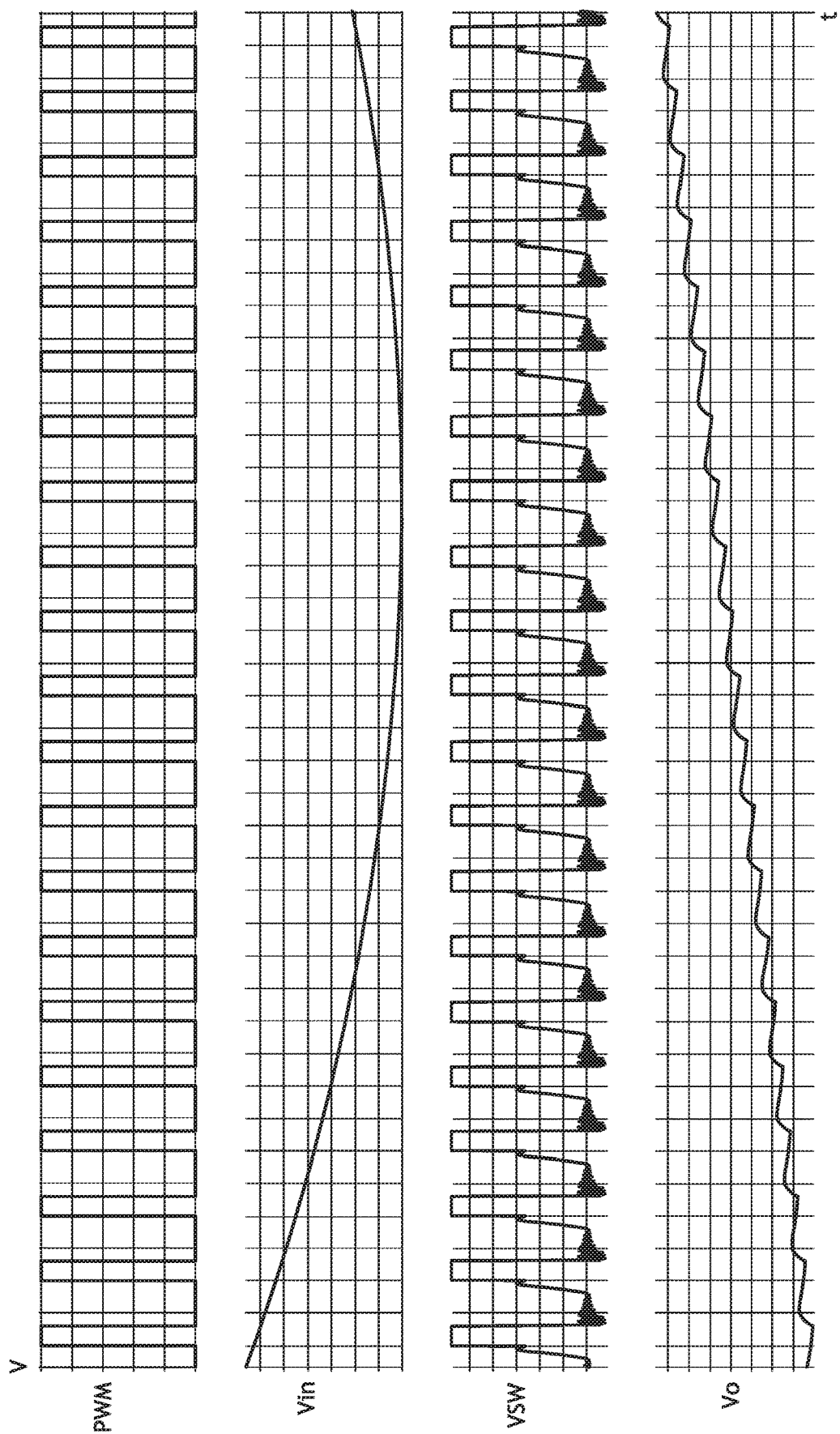
FIG. 7 is the schematic diagram of actuation waveform of the present invention.

Referring to FIG. 3, the main transformer T1 of the present invention can be provided with a snubber U4 to prevent the leakage current of main transformer T1 from damaging the first to fourth switch components S1~S4. Additionally, G terminals of said first and second switch components S1, S2 can be provided with drivers U5, U6 respectively. Moreover, said input AC power supply Vin can be provided with a start circuit 11 to enhance the actuation stability.

Referring to FIGS. 2, 4, 6 and 7, when the comparator 31 detects that the voltage of the first end AC1 of input AC power supply Vin is higher than the voltage of the second end AC2, it is defined as the first phase signal; otherwise, it is the second phase signal. When the Vin phase is the first phase signal and PWM signal is high potential, the first and third control signals CT1, CT3 exported from said logic circuit 331 are high potential, so that the first and third switch components S1, S3 are turned on synchronously to form a primary circuit, while the second and fourth switch components S2, S4 remain off. Said Vin power is stored in main transformer T1 through the first end AC1, the first switch component S1, the primary coil of main transformer T1, the ground terminal PGND, the third switch component S3 and the primary circuit of the second end AC2. Additionally, when the PWM signal is low potential, said first and third switch components S1, S3 are turned off synchronously. The secondary coil of main transformer T1 exports energy to the secondary side circuit 2 to generate output voltage Vo.

Referring to FIGS. 2, 5, 6 and 7, when the Vin is the second phase signal and the PWM signal is high potential, said logic circuit 331 exports the second and fourth control signals CT2, CT4 as high potential, so that the second and fourth switch components S2, S4 are turned on synchronously to form a secondary circuit, while the first and third switch components S1, S3 remain off. The Vin power supply stores energy in main transformer T1 through the second end AC2, the second switch component S2, the primary coil of main transformer T1, the ground terminal PGND, the fourth switch component S4 and the secondary circuit of the first end AC1. When the PWM signal is low potential, the second and fourth switch components S2, S4 are turned off synchronously. The energy stored in the primary coil of main transformer T1 is exported through the secondary coil to the secondary side circuit 2 to generate output voltage Vo.

Figure 8:
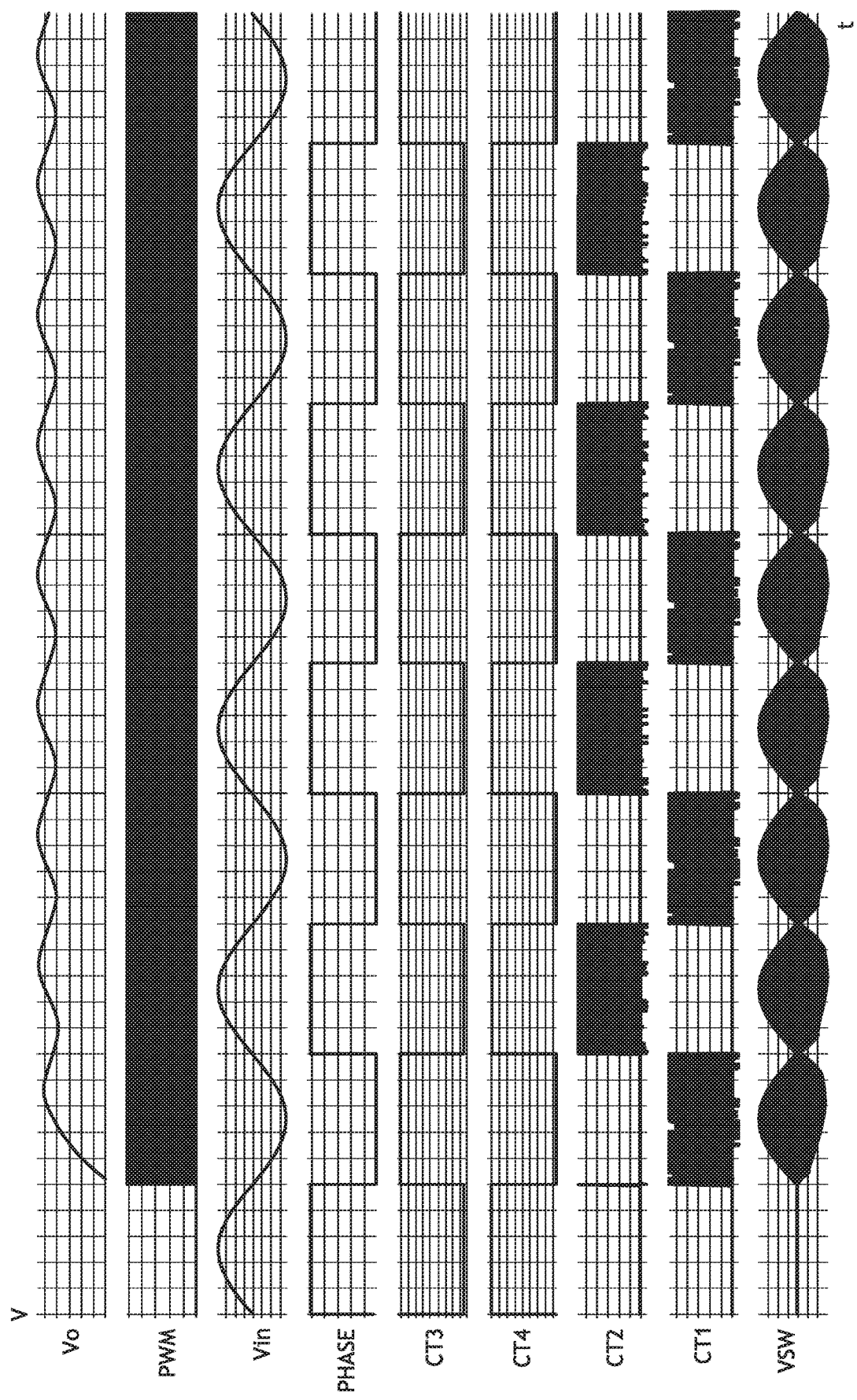
FIG. 8 is the schematic diagram of actuation waveform of the present invention.
Figure 9:
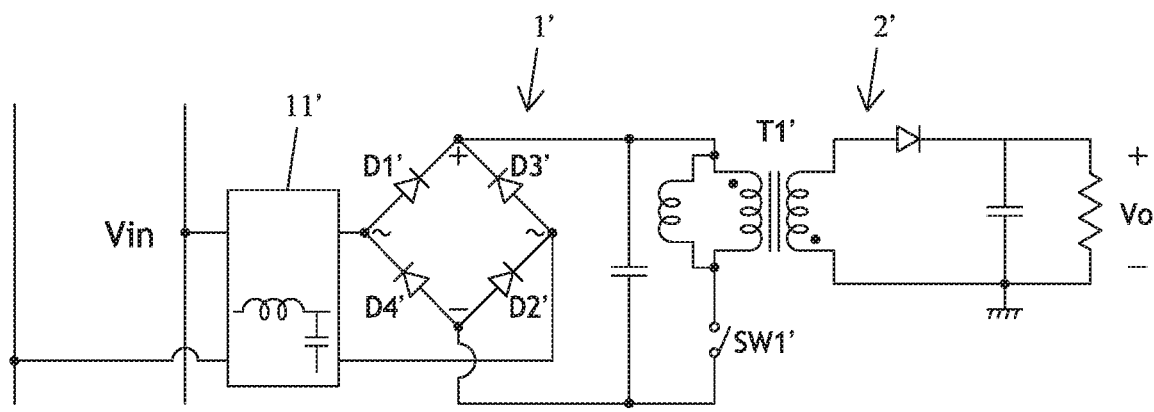
FIG. 9 is a known circuit structure diagram.
Figure 10:
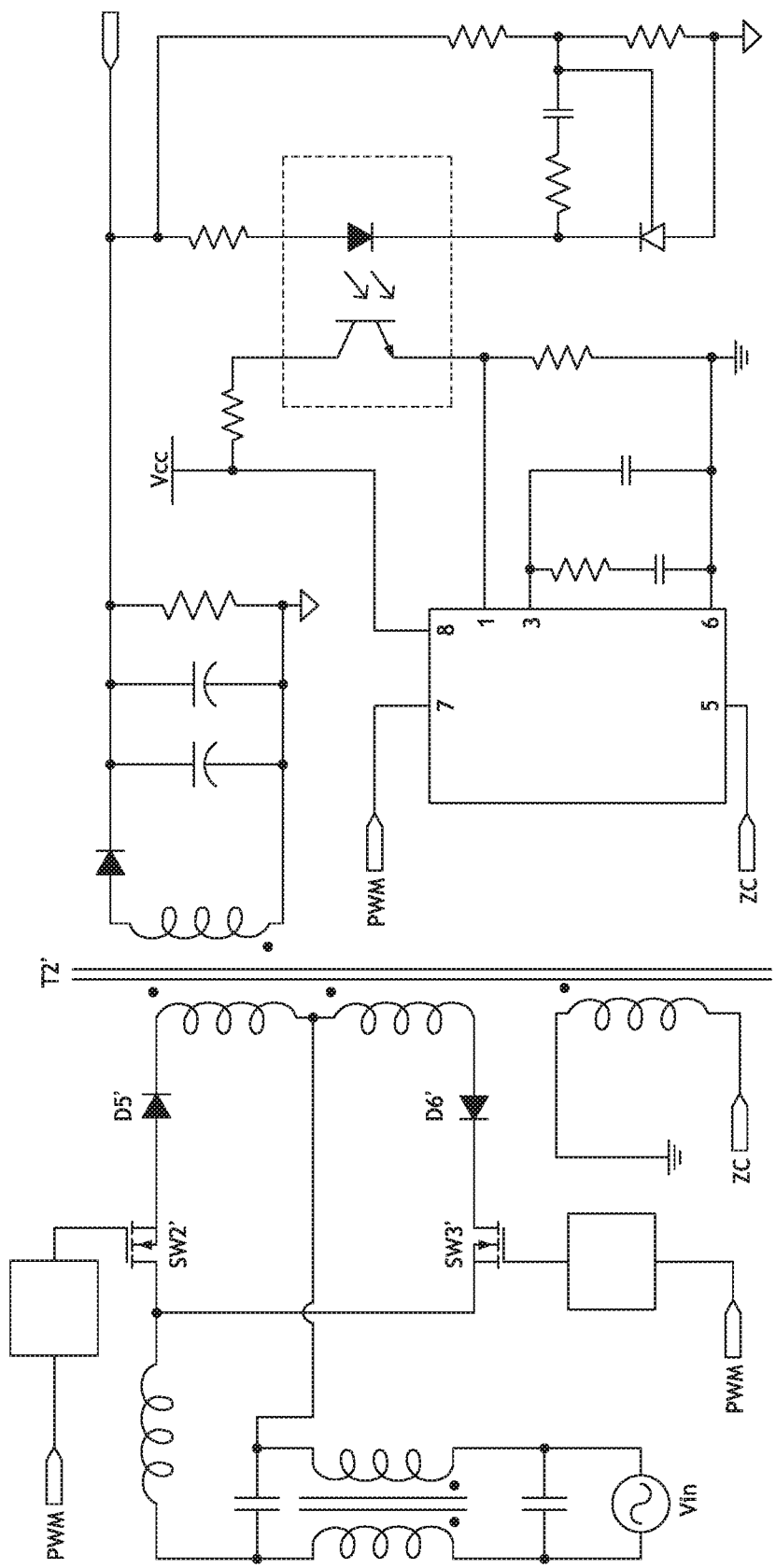
FIG. 10 is a second known circuit structure diagram.
Figure 11:
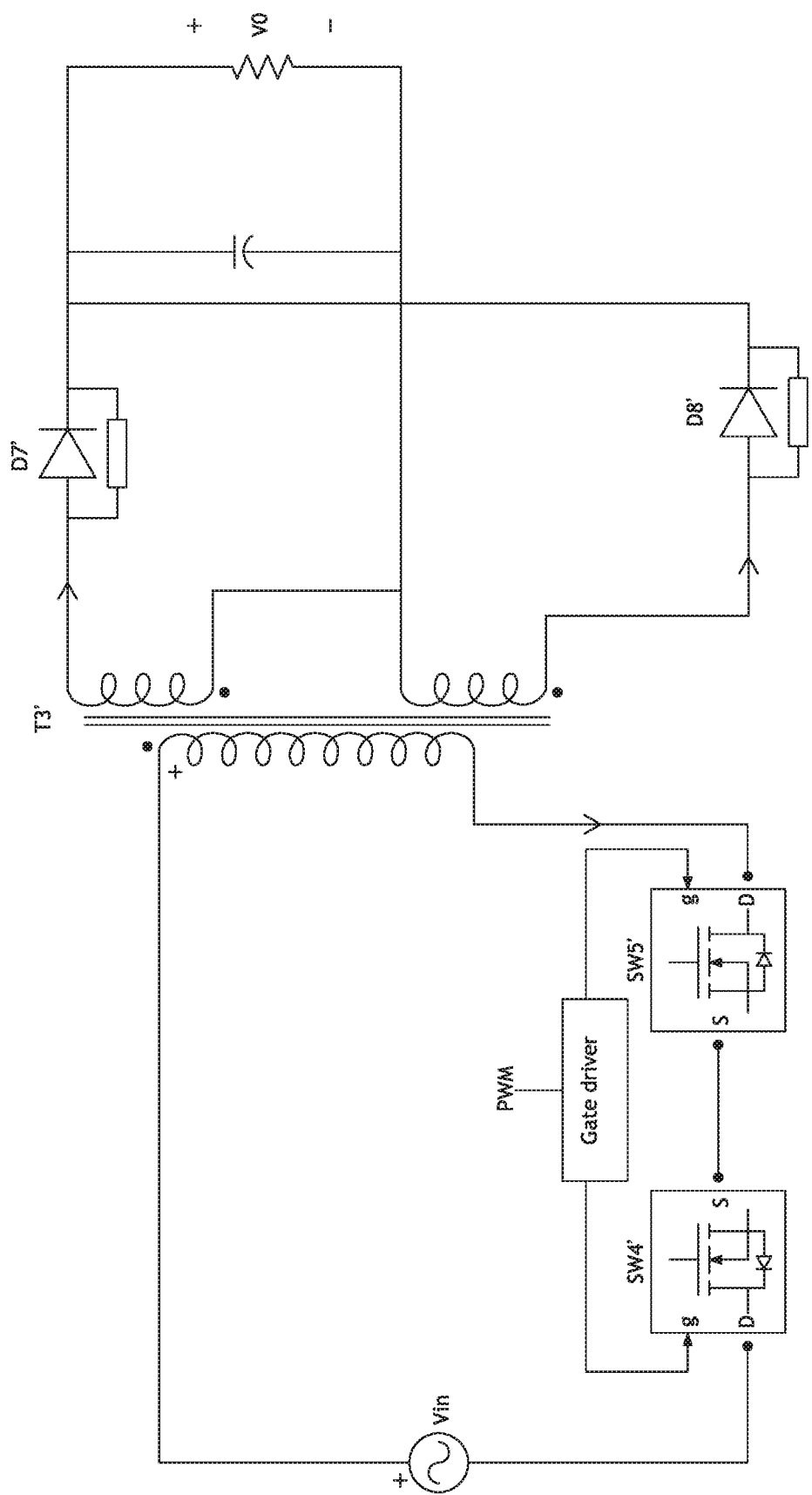
FIG. 11 is a third known circuit structure diagram.
Figure 12:
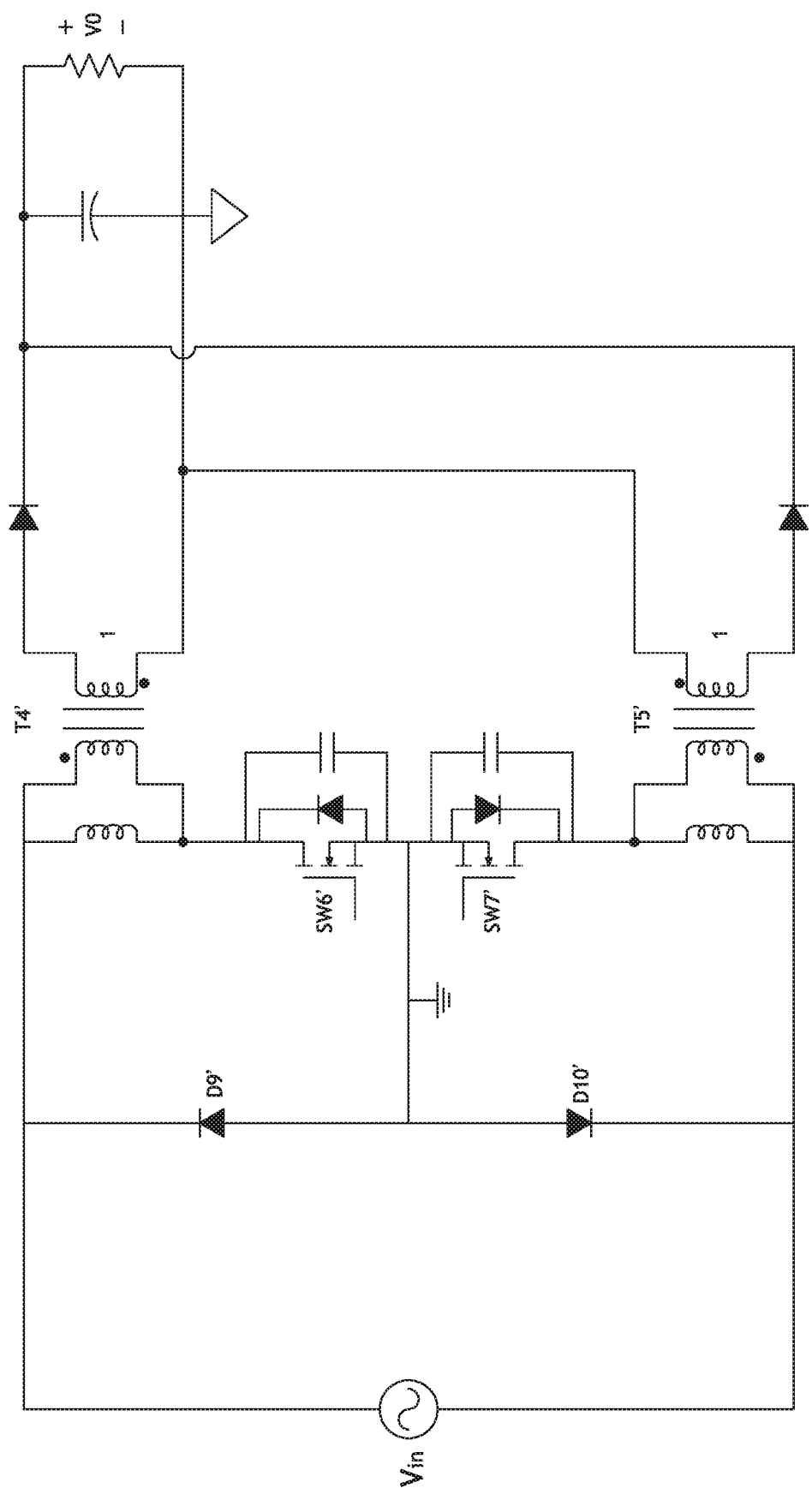
FIG. 12 is a fourth known circuit structure diagram.

As shown in FIG. 8, the third control signal CT3 of the third switch component S3 of the present invention can be synchronous with the first phase signal, while it is not required to be synchronous with the first switch component S1 and PWM signal. Additionally, said fourth control signal CT4 of the fourth switch component S4 can be synchronous with the second phase signal, while it is not required to be synchronous with the second switch component S2 and PWM signal. Moreover, the primary and secondary circuits of the present invention can be actuated, so that the switching frequency of the third and fourth switch components S3, S4 can be reduced, thereby effectively reducing the switching loss.

As stated above, the diode assembly free of bridge rectifier of the present invention can reduce the loss and increase the efficiency. Additionally, the present invention has good actuation stability and compact size. Said embodiments illustrate the present invention, not limit the present invention, any equivalent changes in the spirit of the present invention shall be in the scope of the present invention.

The specific embodiments have been described, there may be modifications and changes within the technical scope of the present invention, the scope of the present invention limits the attached claims.

The invention claimed is:

1. A flyback power switch structure for bridgeless rectification, comprising:
   a main transformer, which is provided with a primary coil and a secondary coil;
   a primary side circuit, which is connected to an input AC power supply and said primary coil of said main transformer, and is provided with a first switch component, a second switch component, a third switch component and a fourth switch component electrically connected to a first end and a second end of the input AC power supply and said primary coil of said main transformer;
   a secondary side circuit, which is connected to said secondary coil of said main transformer, generating an output voltage;
   a feedback control circuit, which is connected to said secondary side circuit and said first switch component, said second switch component, said third switch component, and said fourth switch component of said primary side circuit; wherein the first end and the second end of the input AC power supply are provided with phase comparison signals; and adopting the feedback signals of output voltage from said secondary side circuit and phase comparison signals of the first and second end of said input AC power supply to control actuation of said first switch component, said second switch component, said third switch component, and said fourth switch component, to generate an output voltage,
   wherein one end of said first switch component and said second switch component is connected to one end of said primary coil of said main transformer, while the other end of said primary coil is grounded; additionally, the other end of said first switch component is connected to one end of the fourth switch component with a first junction; said first junction is connected to said first end of the input AC power supply; additionally, the other end of said second switch component is connected to one end of said third switch component with a second junction; said second junction is connected to the second end of said input AC power supply; the other end of said third and fourth switch components is grounded,
   wherein said first switch component, said second switch component, said third switch component, and said fourth switch component are MOSFETs, and wherein said first switch component comprises a first MOSFET and a second MOSFET oppositely cascaded; S terminals of said first and second MOSFETs are connected and G terminals of said first and second MOSFETs are connected, so that they can be turned on and off synchronously; additionally, said second switch component comprises third and fourth MOSFETs oppositely cascaded; S terminals of said third and fourth MOSFETs are connected and G terminals of said third and fourth MOSFETs are connected, so that they can be turned on and off synchronously.

2. A flyback power switch structure for bridgeless rectification comprising:

a main transformer, which is provided with a primary coil and a secondary coil;

a primary side circuit, which is connected to an input AC power supply and said primary coil of said main transformer, and is provided with a first switch component, a second switch component, a third switch component and a fourth switch component electrically connected to a first end and a second end of the input AC power supply and said primary coil of said main transformer;

a secondary side circuit, which is connected to said secondary coil of said main transformer, generating an output voltage;

a feedback control circuit, which is connected to said secondary side circuit and said first switch component, said second switch component, said third switch component, and said fourth switch component of said primary side circuit; wherein the first end and the second end of the input AC power supply are provided with phase comparison signals; and adopting the feedback signals of output voltage from said secondary side circuit and phase comparison signals of the first and second end of said input AC power supply to control actuation of said first switch component, said second switch component, said third switch component, and said fourth switch component, to generate an output voltage, wherein said feedback control circuit has a comparator, an isolated signal sensing circuit, and a controller; said comparator imports the first end and the second end of said input AC power supply, and exports the comparison signals to said controller; additionally, said isolated signal sensing circuit senses the output voltage information of the secondary side circuit, and generates PWM signal to the controller; said controller exports the first, second, third and fourth control signals according to said comparator output signal and PWM signal to control the actuation of said first switch component, said second switch component, said third switch component, and said fourth switch component respectively, and wherein said controller has a logic circuit; in said logic circuit, when the first terminal voltage of said input AC power supply is higher than the second terminal voltage, and the first phase signal and PWM signal are high potential, said first and third control signals turn on said first switch component and said third switch component synchronously to form a primary circuit, while said second switch component and said fourth switch component remain off; when the PWM signal is low potential, said first and third control signals turn off said first switch component and said third switch component synchronously; additionally, when the second terminal voltage of said input AC power supply is higher than the first terminal voltage, and the second phase signal and PWM signal are high potential, said second and fourth control signals turn on said second switch component and said fourth switch component synchronously to form a secondary circuit, while said first switch component and said third switch component remain off;

additionally, when the PWM signal is low potential, said second and fourth control signals turn off said second switch component and said fourth switch component synchronously.

3. The flyback power switch structure for bridgeless rectification defined in claim 2, wherein said controller has a logic circuit; in said logic circuit, when the first terminal voltage of said input AC power supply is higher than the second terminal voltage, and the first phase signal and PWM signal are high potential, said first control signal turns on said first switch component, said third control signal and said first phase signal act synchronously to turn on said third switch component to form a primary circuit; additionally, when the PWM signal is low potential, said first control signal turns off said first switch component, while said second switch component and said fourth switch component remain off in this phase; additionally, when the second terminal voltage of said input AC power supply is higher than the first terminal voltage, and the second phase signal and PWM signal are high potential, said second control signal turns on said second switch component; additionally, said fourth control signal and said second phase signal act synchronously to turn on said fourth switch component to form a secondary circuit; additionally, when the PWM signal is low potential, said second control signal turns off said second switch component, while said first switch component and said third switch component remain off in this phase.

* * * * *